United States Patent
Fuchs et al.

(10) Patent No.: US 8,565,992 B2
(45) Date of Patent: Oct. 22, 2013

(54) METHOD FOR BRAKING ELECTRICALLY DRIVEN VEHICLES

(75) Inventors: Andreas Fuchs, Erlangen (DE); Frank Jacobi von Wangelin, Erlangen (DE); Bernd Laska, Herzogenaurach (DE); Lars Löwenstein, Heβdorf (DE)

(73) Assignee: Siemens Aktiengesellschaft, Munich (DE)

( * ) Notice: Subject to any disclaimer, the term of this patent is extended or adjusted under 35 U.S.C. 154(b) by 661 days.

(21) Appl. No.: 12/227,592

(22) PCT Filed: Mar. 15, 2007

(86) PCT No.: PCT/EP2007/052427
§ 371 (c)(1),
(2), (4) Date: Nov. 21, 2008

(87) PCT Pub. No.: WO2007/134889
PCT Pub. Date: Nov. 29, 2007

(65) Prior Publication Data
US 2010/0191432 A1 Jul. 29, 2010

(30) Foreign Application Priority Data
May 23, 2006 (DE) .......................... 10 2006 024 239

(51) Int. Cl.
*B60L 7/10* (2006.01)
*B60L 7/26* (2006.01)
(52) U.S. Cl.
CPC ..... *B60L 7/26* (2013.01); *B60L 7/10* (2013.01)
USPC .............................................. 701/70; 701/22
(58) Field of Classification Search
CPC ..................................... B60L 7/10; B60L 7/26
USPC .............. 701/22, 70; 303/22.6, 152; 188/171, 188/173; 318/380
See application file for complete search history.

(56) References Cited

U.S. PATENT DOCUMENTS

| | | | |
|---|---|---|---|
| 3,845,991 | A | 11/1974 | Engle |
| 5,378,053 | A | 1/1995 | Patient et al. |

(Continued)

FOREIGN PATENT DOCUMENTS

| | | |
|---|---|---|
| DE | 10 2004 032 680 | 2/2006 |
| DE | 10 2004 032680 | 2/2006 |

(Continued)

OTHER PUBLICATIONS

German office Action PCT/IPEA/416.

(Continued)

*Primary Examiner* — John Q Nguyen
*Assistant Examiner* — Michael Whalen
(74) *Attorney, Agent, or Firm* — Harness, Dickey & Pierce, P.L.C.

(57) ABSTRACT

A method is disclosed for braking electrically driven vehicles, in particular rail vehicles. In at least one embodiment, the behavior of the brake system is configured directly as a function of the system state, i.e. the operating conditions of the vehicle, such as for example the laden state of the vehicle, temperature of the engines and in particular of the magnets, as well as redundancy requirements, and therefore permit the fully functioning mechanical brake which is present in vehicles nowadays to be eliminated. The method of at least one embodiment for braking electrically driven vehicles which are equipped with spring-store-based friction brakes and whose motive drive is provided by way of permanently excited synchronous machines whose terminals are connected via switches to devices which generate a braking torque includes an open-loop or closed-loop controller being activated and the controller connecting the brake system of the engines which are present and the spring-store-based friction brakes into the circuit individually and successively as a function of the operating conditions of the vehicle and the required brake values.

17 Claims, 2 Drawing Sheets

(56) References Cited

U.S. PATENT DOCUMENTS

| | | | |
|---|---|---|---|
| 5,469,031 A * | 11/1995 | Chorey | 318/375 |
| 5,486,039 A * | 1/1996 | Petiot | 303/22.6 |
| 5,839,800 A | 11/1998 | Koga et al. | |
| 5,992,950 A * | 11/1999 | Kumar et al. | 303/151 |
| 6,270,172 B1 * | 8/2001 | Shirai et al. | 303/152 |
| 6,425,643 B2 * | 7/2002 | Shirai et al. | 303/112 |
| 6,607,253 B1 * | 8/2003 | Yamamoto et al. | 303/112 |
| 6,803,734 B2 * | 10/2004 | Kumar et al. | 318/375 |
| 6,938,555 B2 * | 9/2005 | Jockel | 105/34.1 |
| 7,219,967 B2 * | 5/2007 | Magnien et al. | 303/152 |
| 7,372,227 B2 * | 5/2008 | Rainer et al. | 318/375 |
| 8,076,878 B2 * | 12/2011 | Hahle et al. | 318/376 |
| 2003/0110849 A1 | 6/2003 | Lonzinski et al. | |
| 2003/0222611 A1 * | 12/2003 | Kumar et al. | 318/375 |
| 2004/0222761 A1 * | 11/2004 | Jockel | 318/376 |
| 2005/0065693 A1 * | 3/2005 | Wang et al. | 701/70 |
| 2005/0159871 A1 * | 7/2005 | Nakamura et al. | 701/70 |
| 2005/0283299 A1 * | 12/2005 | Du et al. | 701/70 |
| 2006/0102394 A1 * | 5/2006 | Oliver | 180/65.2 |
| 2006/0125317 A1 * | 6/2006 | Kokubo et al. | 303/152 |
| 2006/0131956 A1 * | 6/2006 | Matsuura et al. | 303/152 |
| 2006/0220453 A1 * | 10/2006 | Saito et al. | 303/152 |
| 2007/0241611 A1 * | 10/2007 | Shimada et al. | 303/152 |
| 2007/0267915 A1 * | 11/2007 | Shimada et al. | 303/122 |
| 2007/0272457 A1 * | 11/2007 | Kodama et al. | 180/65.3 |
| 2007/0273204 A1 * | 11/2007 | Kodama et al. | 303/146 |
| 2008/0100129 A1 * | 5/2008 | Lubbers | 303/113.1 |
| 2009/0234548 A1 * | 9/2009 | Bergner et al. | 701/70 |

FOREIGN PATENT DOCUMENTS

| | | |
|---|---|---|
| DE | 102004032680 A1 | 2/2006 |
| EP | 0 666 431 | 8/1995 |
| EP | 0666431 A1 | 8/1995 |
| EP | 0 758 591 | 2/1997 |
| EP | 0758591 A1 | 2/1997 |
| EP | 0 666 431 | 3/1997 |
| EP | 0 758 591 | 3/2000 |

OTHER PUBLICATIONS

Office Action for corresponding Canadian patent application No. 2,653,018 dated Apr. 12, 2013.

* cited by examiner

METHOD FOR BRAKING ELECTRICALLY DRIVEN VEHICLES

PRIORITY STATEMENT

This application is the national phase under 35 U.S.C. §371 of PCT International Application No. PCT/EP2007/052427 which has an International filing date of Mar. 15, 2007, which designated the United States of America and which claims priority on German application No. 10 2006 024 239.4 filed May 23, 2006, the entire contents of which are hereby incorporated herein by reference.

FIELD

At least one embodiment of the invention generally relates to a method for braking electrically driven vehicles, in particular rail vehicles, whose drive is provided by permanently excited synchronous machines.

BACKGROUND

According to the prior art, the braking of rail vehicles takes place by way of an electro-pneumatic braking arrangement. The design of such systems is based on the maximum vehicle loading under the assumption of adverse ambient conditions (for example friction value).

Unregulated braking would, for example under partial loading, result in the required deceleration values being exceeded. The adjustment/regulation of the mechanical brake usually takes place by way of a load-dependent variation of the brake pressure.

In the most recent stage of development, permanently excited synchronous machines with separate electric brake circuits are used for driving vehicles, in particular rail vehicles.

Document DE 10 2004 032 680 A1 discloses a motor brake for an electrically driven vehicle, in particular for a rail vehicle, having a permanently excited synchronous machine, with terminals of the synchronous machine being connected via switches to devices which generate a braking torque. Here, it is provided that a capacitor is connected in parallel at least to one of the devices which generate a braking torque, in order to ensure an increased braking power by varying the operating point of the synchronous machine.

The devices which generate a braking torque are for example brake resistances which can be variable.

By connecting a permanently excited synchronous machine in a circuit with ohmic resistances (R) or combinations of ohmic resistances and capacitors (RC), the action of the motor brake is optimized with respect to the rotational speed of the synchronous machine, and it is possible to realize a reliable electric brake, in particular for rail vehicles.

With the described circuit connection of the permanently excited synchronous machine, extremely different boundary conditions, such as for example load state of the vehicle, temperature of the motors and in particular of the magnets, and redundancy requirements, have the result that, for a fixed dimensioning of R or RC, the braking deceleration limit values prescribed by the operator or in standards are not always adhered to.

In the event of a simultaneous activation of all of the provided braking systems, that is to say without controlling intervention, the limit values for deceleration are exceeded in several system states.

Such behavior is not accepted by the operators and prevents the use of a reliable electric brake for rail vehicles.

SUMMARY

At least one embodiment of the invention is directed to improving or even optimally configuring the behavior of the brake system so as to be directly dependent on the system state, that is to say on the stated boundary conditions of the vehicle, and to thereby dispense with the fully-rated mechanical brake (as opposed to the mechanical parking brake for the parked state) which is provided in vehicles nowadays.

DETAILED DESCRIPTION OF THE EXAMPLE EMBODIMENTS

Figure 1:
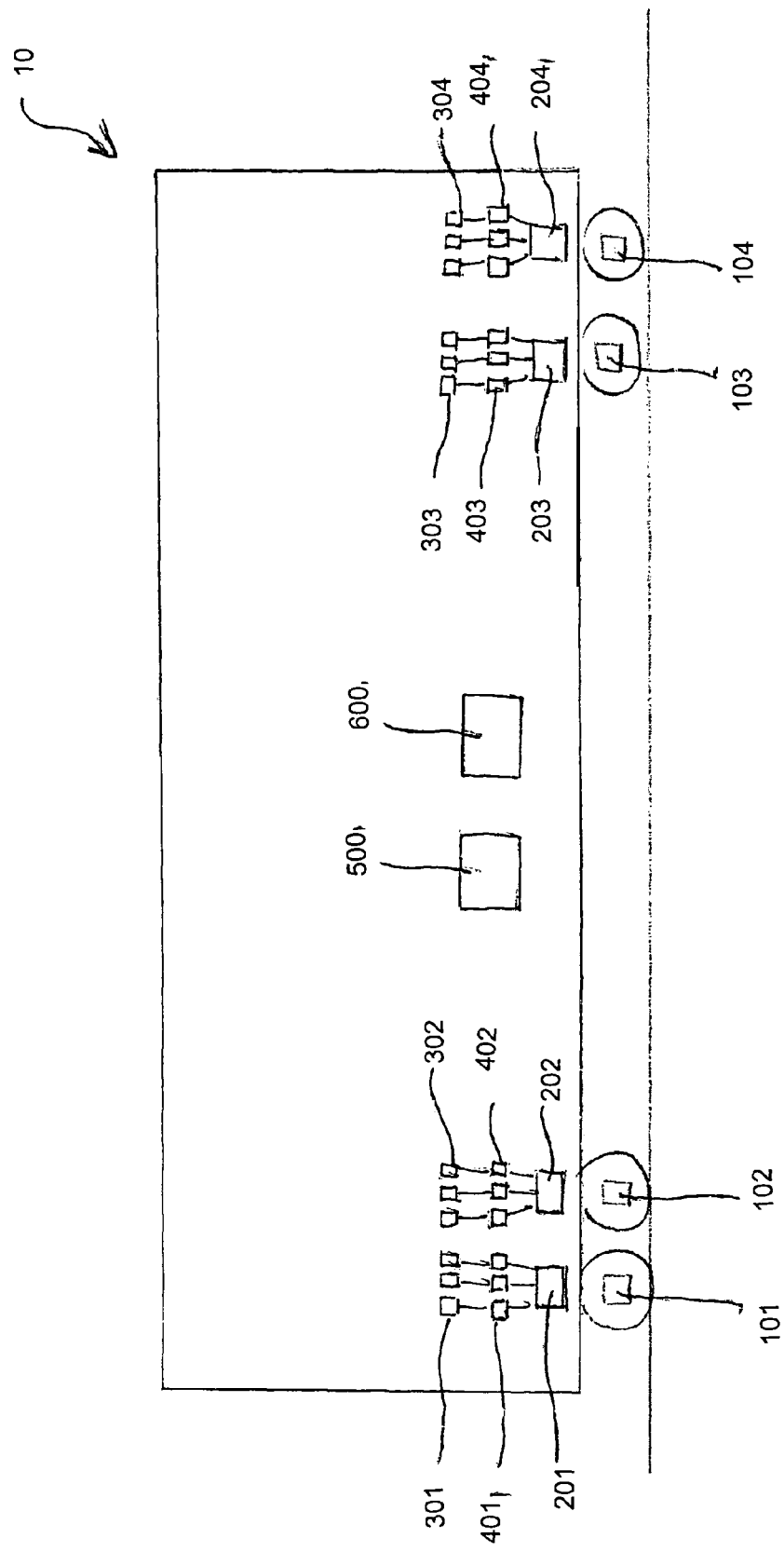
FIG. 1 is a schematic diagram of an example embodiment of a railway vehicle which may be braked by the method described herein.
Figure 2:
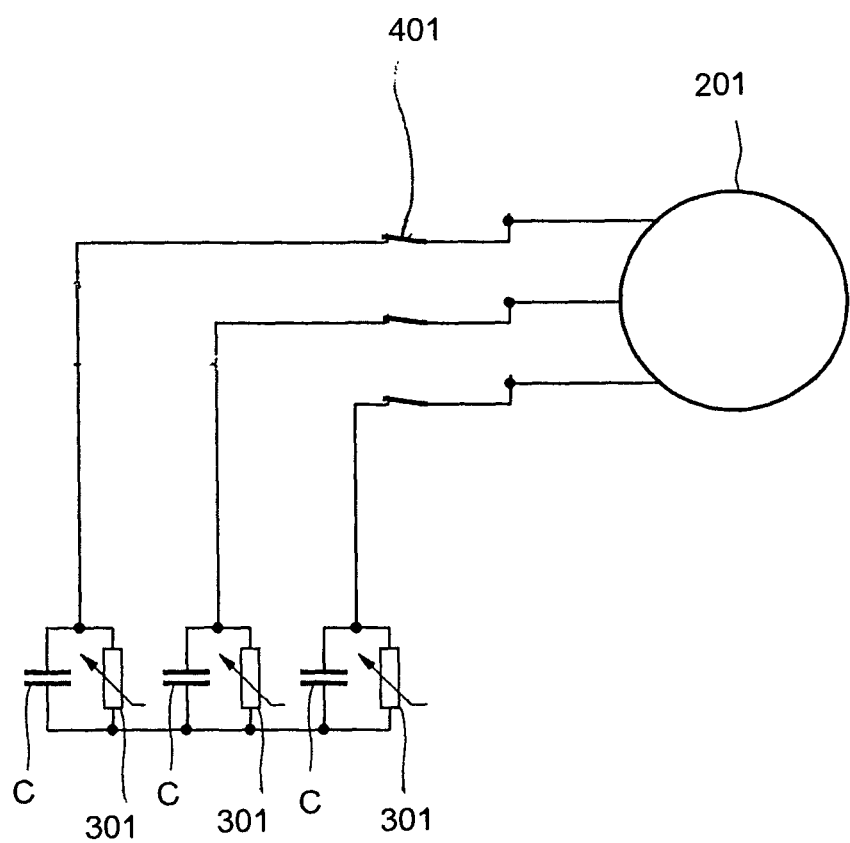
FIG. 2 is a diagram of a synchronous machine connected with braking torque producing devices according to an example embodiment of the invention.

According to an example embodiment of the invention shown in FIGS. 1 and 2, for braking electrically driven vehicles, in particular rail vehicles 10, which are fitted with spring-store-based friction brakes 101-104 and whose motor drive is provided by permanently excited synchronous machines 201-204, with the terminals of the synchronous machine being connected via switches 401-404 to devices which generate a braking torque 301-304, a controller 500 or regulator is activated which activates the spring-store-based friction brakes 101-104 and the braking of the provided motors 201-204 individually and in succession as a function of the actual operating conditions (brake performance) of the vehicle 10 and the required braking values.

Depending on the system architecture, it is possible for both the braking power of each motor 201-204 and also the braking power of the spring-store-based friction brakes 101-104 to be activated individually and independently of one another, and therefore to meet the demand for a reliable overall braking power.

To determine the system state, the following operating variables of the vehicle are for example detected as input variables for the control/regulation of the overall braking power of the vehicle:

measurement of the deceleration by means of suitable sensors,
measurement of the engine currents and calculation by means of machine model,
measurement of the zero crossings of the motor voltages and determining the deceleration by variance determination,
measurement of the motor or intermediate circuit power,
measurement of the power in braking resistance,
measurement of the rotational speeds,
temperature measurements,
load cycle measurement in combination with air spring pressure measurement.

An actual characteristic curve is formed on the basis of the measured operating values from a measuring unit 600 and is compared with a nominal characteristic curve which is applicable for adhering to the required braking values. As long as there is a negative nominal/actual deviation, that is to say an undershooting of the nominal value, the braking of the motors

201-204, by connecting the motors to the R circuit or RC circuit, and the braking of the spring-store-based friction brakes 101-104 are activated in succession, taking into consideration a tolerance band.

It is also provided that an actual characteristic curve formed from the rotational speed of the motors 201-204 and the acceleration of the vehicle 10 is compared with a nominal characteristic curve which is stored in a non-volatile memory, and that the braking of the motors 201-204 and of the spring-store-based friction brakes 101-104 is activated in the event of a negative nominal/actual deviation.

A logical lock mechanism is expediently provided which prevents the simultaneous activation of more than one brake component.

In contrast, however, all of the spring-store-based friction brakes may be activated together.

As a result of the possibility of activating electrical and mechanical braking power individually and in succession, it is possible for the provided braking force to be controlled, and for the influences of boundary conditions, such as for example loading state of the vehicle, temperature of the motors and in particular of the magnets, to thereby be compensated.

The braking profile takes place according to the projectable nominal characteristic curve. Demanded limit values of the braking deceleration are adhered to. In addition, the undesired jolt when the brakes are applied is limited.

By way of embodiments of the invention, it is possible to obtain the use of the reliable electric brake, and to thereby dispense with the fully-rated mechanical brake which is provided in vehicles nowadays, and to meet comfort and deceleration demands in the braking of electrically driven vehicles.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for braking an electrically driven railway vehicle fitted with spring-store-based friction brakes and with a motor drive provided by permanently excited synchronous machines, the terminals of the synchronous machine being connected via switches to devices which generate a braking torque, the method comprising:
   at least one of measuring and evaluating a plurality of the following operating conditions:
   measuring deceleration via at least one sensor,
   measuring zero crossings of motor voltages and determining the deceleration by variance determination,
   measuring motor or intermediate circuit power,
   measuring power in braking resistance,
   measuring rotational speeds, and
   measuring temperature
   using said plurality of operation conditions as input variables for at least one of control and regulation of the overall braking power of the railway vehicle, said at least one of control and regulation comprising:
   comparing said measured plurality of operation conditions with a stored characteristic map involving the same measured operation conditions of said plurality of operating conditions to determine a nominal/actual comparison, the stored characteristic map being stored in a memory and being available for adhering to braking deceleration limit values prescribed by at least one of a railway company and in standards;
   sequentially activating for braking, via at least one of a controller and a regulator, each of the provided synchronous machines of the railway vehicle and the spring-store-based friction brakes of the railway vehicle individually and in succession as a function of said nominal/actual comparison.

2. The method as claimed in claim 1, wherein the braking power of the synchronous machines and the braking power of the spring-store-based friction brakes are activated independently of one another.

3. The method as claimed in claim 2, wherein an actual characteristic curve is formed on the basis of the measured operating values and is compared with a nominal characteristic curve which is applicable for adhering to the required braking values, and wherein further engine brakes or spring-store-based friction brakes are activated in the event of a nominal/actual deviation of the braking, taking into consideration a tolerance band.

4. The method as claimed in claim 2, wherein simultaneous activation of more than one brake component is prevented by a logical lock mechanism.

5. The method as claimed in claim 2, wherein all the spring-store-based friction brakes are activated together.

6. The method as claimed in claim 2, wherein the braking of the synchronous machines and of the spring-store-based friction brakes is configured such that it can be deactivated.

7. The method as claimed in claim 1, wherein an actual characteristic curve is formed on the basis of the measured operating values and is compared with a nominal characteristic curve which is applicable for adhering to the required braking values, and wherein further engine brakes or spring-store-based friction brakes are activated in the event of a nominal/actual deviation of the braking, taking into consideration a tolerance band.

8. The method as claimed in claim 7, wherein simultaneous activation of more than one brake component is prevented by a logical lock mechanism.

9. The method as claimed in claim 7, wherein all the spring-store-based friction brakes are activated together.

10. The method as claimed in claim 7, wherein the braking of the synchronous machines and of the spring-store-based friction brakes is configured such that it can be deactivated.

11. The method as claimed in claim 1, wherein simultaneous activation of more than one brake component is prevented by a logical lock mechanism.

12. The method as claimed in claim 1, wherein all the spring-store-based friction brakes are activated together.

13. The method as claimed in claim 1, wherein the braking of the synchronous machines and of the spring-store-based friction brakes is configured such that it can be deactivated.

14. The method as claimed in claim 1, wherein a capacitor is connected in parallel at least to one of the devices which generates a braking torque.

15. The method as claimed in claim 1, wherein the method is for braking electrically driven vehicles which are rail vehicles.

16. The method as claimed in claim 1,
   wherein said plurality of operation conditions correspond to a rotational speed of the motors and the deceleration of the vehicle.

17. The method as claimed in claim 1,
   wherein using said plurality of operation conditions with a stored characteristic map to determine a nominal/actual comparison includes building an actual characteristic map on the basis of said plurality of operating conditions and comparing the actual characteristic map with the stored characteristic map.

* * * * *